Feb. 12, 1957  J. CHAMBERLAIN  2,780,938
MASS FLOW MEASURING DEVICE
Filed Dec. 9, 1953
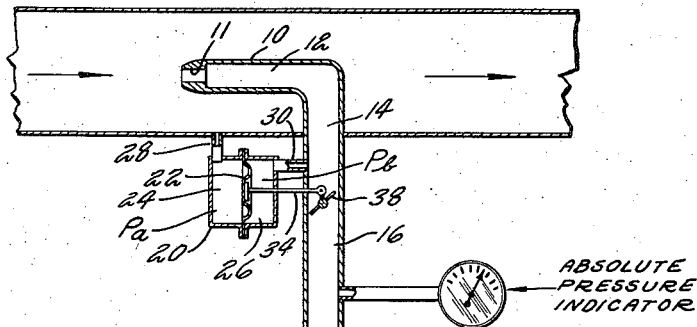
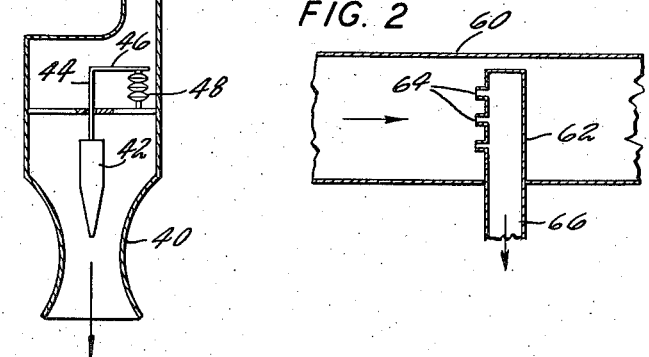
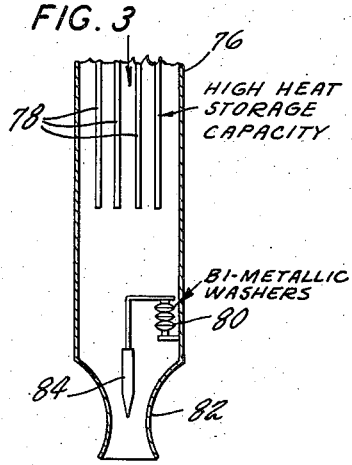
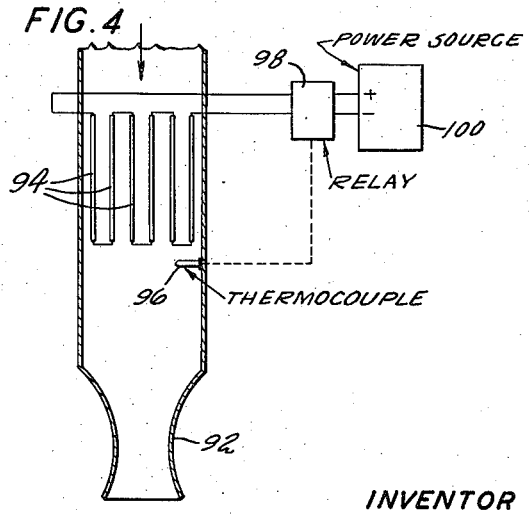
INVENTOR
JOHN CHAMBERLAIN
BY Leonard F. Wehlin
ATTORNEY

United States Patent Office 2,780,938
Patented Feb. 12, 1957

2,780,938

MASS FLOW MEASURING DEVICE

John Chamberlain, Manchester, Conn., assignor to United Aircraft Corporation, East Hartford, Conn., a corporation of Delaware Application December 9, 1953, Serial No. 397,064

6 Claims. (Cl. 73—202)

This invention relates to air flow measuring devices and more particularly to mass flow measuring devices.

The usual method of measuring air flow is to measure some representative pressures by means of a Pitot-static tube, venturi, orifice or other device, measure the air temperature and calculate the flow. This procedure is often satisfactory but in many cases it is too cumbersome.

It is therefore a primary object of this invention to provide a mass flow measuring device which will produce a signal directly proportional to air flow regardless of air temperature, velocity or pressure of the stream to be measured.

It is a further object of this invention to provide a mass flow measuring device of the type described which samples a fixed proportion of the air flow and produces a pressure signal directly proportional to the mass flow of the stream.

These and other objects of this invention will become readily apparent from the following detail description of the drawing in which:

Fig. 1 is a schematic illustration in partial cross section of the mass flow measuring device of this invention.

Fig. 2 is a partial cross-sectional illustration of a modified probe.

Fig. 3 is a partial cross-sectional illustration of a modified exhaust nozzle for the Fig. 1 instrument; and Fig. 4 is another modified exhaust nozzle.

Referring to Fig. 1, a probe 10 is exposed to a free airstream or a ducted airstream so as to take in a representative sample of the free stream through the inlet 11 and into the duct 12. The duct 12 communicates with a passageway 14 which leads to the main measuring passage 16.

In accordance with this invention it is desirable to obtain a sample of the main stream which will be a fixed proportion of the air flow passing the probe 10. To obtain this fixed proportion a differential pressure unit 20 is utilized. This unit comprises a flexible diaphragm 22 which has either side thereof exposed to pressure in the chamber 24 and the chamber 26. The chamber 24 is connected to a line 28 which senses the static pressure of the main stream. The chamber 26 is connected to a passage 30 which senses the static pressure in the probe passageway 14. The diaphragm 22 is connected to a rod 34 which in turn is operatively connected to a butterfly throttle valve 38. The throttle valve 38 will be operated in response to movement of the diaphragm 22 so that when a stabilized condition exists a given flow will pass to the passage 16. This condition can best be defined in the following terms.

In the duct:
 Total pressure=$P_T$
 Static pressure=$P_a$=$P_{line\ 28}$
In the probe inlet:
 Total pressure=$P_T$ (same as in duct)
 Static pressure=$P_b$=$P_{line\ 30}$
 (If duct 12 is sufficiently large compared to inlet 11.)

When the throttle valve 38 has stabilized, the pressure in line 28 will equal the pressure in line 30.

Then, static pressure in the probe inlet=the static pressure in the duct, and, the velocity in the probe inlet=the velocity in the duct.

Thus, airflow in the duct=the airflow in the probe ×

$$\frac{\text{Area (duct)}}{\text{Area (probe inlet)}}$$

The flow in the passage 16 is exhausted to a source of lower pressure via a convergent-divergent nozzle 40. A tapered plug 42 is located within the nozzle 40 and by means of integral rods 44 and 46 the plug 42 is operatively connected to a stack 48 of dished bi-metallic washers. Thus, with a variation of temperature of the air in the passageway 16 the bi-metallic washers will respond to move the plug 42 axially of the nozzle so as to vary the area thereof.

The airflow through the convergent-divergent nozzle 40 is maintained "choked" by exhausting to a suitable low pressure, i. e., a region having a pressure which is .8 or less than the pressure in the passage 16. Under these conditions the airflow through the nozzle is $$W = \frac{P \times A}{\sqrt{T}} \times C$$

where $W$=airflow through the nozzle
$P$=pressure ahead of the nozzle
$A$=area of the nozzle
$T$=absolute temperature ahead of the nozzle
$C$=constant.

The temperature responsive nozzle area varying device provides that $$\frac{A}{\sqrt{T}} = K \text{ (constant)}$$

then $W = P \times K \times C.$

Hence $P$ is proportional to the probe air flow, and since the probe air flow is a fixed percentage of the duct air flow, $P$ is proportional to duct air flow also.

Referring to Fig. 2 a duct 60 is illustrated and a modified probe 62 is suitably mounted therein. The probe 62 has a plurality of fluid receiving openings 64 spaced transversely of the fluid stream. The flow from all of the openings 64 is collected in a passage 66 which passageway leads to the mass flow measuring device. The probe 62 is intended for use in a confined or free stream where the stream conditions may vary. Thus with a number of openings 64 sampling portions of the stream the passageway 66 will contain an average sample of the stream.

Fig. 3 shows a modification of the exhaust nozzle shown in Fig. 1. As illustrated herein the passageway 76 contains a plurality of elongated plates 78 which are formed of a material such as copper which has a high heat storage capacity. The plates 78 may take the form of cowls or any other suitable shape. The reason for the plates 78 is to provide for a very fast temperature compensation. Thus if the air entering the probe 10 of Fig. 1 suddenly becomes much hotter or colder this air is heated or cooled to a point close to its previous temperature by the elements 78. As the elements 78 are gradually heated or cooled the temperature compensating bi-metallic washers 80 can slowly follow up and vary the area of the nozzle 82 by moving the plug 84 axially of the nozzle.

Fig. 4 illustrates still another modification of the nozzles shown in Figs. 1 and 3. As illustrated herein, the device does not include mechanism for varying the area of the nozzle 92. Instead, elongated heating elements 94 are provided upstream of the nozzle 92. A thermocouple 96 is located in the sampled airstream downstream of the heating elements 94 and is intended to operate a relay generally indicated at 98 which in turn can control electrical power from a suitable power source 100. Any thermostat device may be used to provide off-on control as for example an ordinary furnace control. Thus the small sample of air which is being exhausted through the nozzle 92 can be heated to a constant temperature thus maintaining the flow choked at the nozzle 92. This form of temperature compensation is feasible since the sample of air admitted by a probe of the type illustrated in Figs. 1 or 2 will be relatively small in quantity.

In view of the foregoing it is readily apparent that an efficient and highly accurate mass flow measurement can be obtained without the requirement of elaborate instrumentation or complicated mechanisms.

Although several embodiments of this invention have been illustrated and described herein it will be readily apparent that various changes and modifications may be made in the construction and arrangement of the several parts without departing from the scope of this novel concept.

What it is desired to obtain by Letters Patent is:

1. In a fluid flow measuring device, a probe for sampling a portion of the stream whose flow is to be measured, a conduit, means for conducting the fluid flow from said probe to said conduit, means for controlling the flow of fluid in said conduit comprising a throttle valve in said passageway and a device responsive to the differential of the static pressure in the main stream and the static pressure in said conduit upstream of said valve, said device operating said throttle valve, means for exhausting the flow from said conduit to a low pressure region including an exhaust nozzle, means responsive to the temperature of the fluid in said conduit for varying the area of said nozzle, and means for determining the pressure of the fluid in said conduit at a point upstream of said nozzle but downstream of said valve.

2. In an instrument for measuring the mass flow of a fluid stream, a passage means for sampling a portion of the stream and conducting it into said passage means, means responsive to a pressure in said passage means and a pressure in the fluid stream for controlling the flow in said passage means including a valve for varying the flow in said passage means, nozzle means downstream of said controlling means for exhausting the flow from said passage means, temperature responsive mechanism located between said valve and said nozzle means for varying the flow characteristics in said passage means, and means for measuring the amount of mass flow in the fluid stream comprising mechanism responsive to the pressure at a point in said passage means located between said valve and said temperature responsive mechanism.

3. In a fluid flow measuring device, a probe for sampling a portion of the main stream whose flow is to be measured, a conduit, means for conducting fluid flow from said probe to said conduit, throttle means in said conduit for controlling the flow of fluid in said conduit, means responsive to the static pressure in said main stream and the static pressure in said conduit for operating said throttle means, means for exhausting the flow of fluid from said conduit including a convergent-divergent nozzle located downstream of said throttle means, means in said conduit for varying the area of said nozzle, means responsive to the temperature of the fluid adjacent said nozzle for controlling said area varying means, and pressure responsive means connected to said conduit for measuring the pressure of the fluid in said conduit at a point upstream of said nozzle but downstream of said throttle means.

4. In a fluid flow measuring device, a probe for sampling a portion of the main stream whose flow is to be measured, a conduit, means for conducting fluid flow from said probe to said conduit, throttle means in said conduit for controlling the flow of fluid in said conduit, means responsive to the static pressure in said main stream and the static pressure in said conduit for operating said throttle means, means for exhausting the flow of fluid from said conduit including a nozzle located downstream of said throttle means, a heat exchange device upstream of said nozzle for varying the temperature characteristics of the fluid in said conduit, and means for measuring the pressure of the fluid in said conduit at a point upstream of said nozzle but donwstream of said throttle means.

5. In a measuring device according to claim 4 wherein said last mentioned means determines the static pressure in said conduit upstream of said heat exchange device.

6. In an instrument for measuring the mass flow of a main fluid stream, a passage means for sampling a portion of the stream and conducting it into said passage means, means responsive to a pressure in said passage means and a pressure in the main fluid stream for controlling the flow in said passage means including a valve for varying the flow in said passage means, nozzle means downstream of said controlling means for exhausting the flow from said passage means including means for controlling the area of said exhaust nozzle, means responsive to the temperature of the fluid adjacent said nozzle means for operating said area controlling means, and means for measuring the amount of mass flow in the fluid stream comprising mechanism responsive to the pressure at a point in said passage means located between said valve and said nozzle means.

References Cited in the file of this patent
UNITED STATES PATENTS

| Re. 21,127 | Boyle | June 27, 1939 |
| 475,596 | McDonald | May 24, 1892 |
| 1,110,413 | Wylie | Sept. 15, 1914 |
| 1,664,596 | Diehl | Apr. 3, 1928 |
| 2,044,806 | Naiman | June 23, 1936 |
| 2,402,350 | Silver | June 18, 1946 |
| 2,549,622 | Moore, Jr. et al. | Apr. 17, 1951 |
| 2,675,020 | Breitwieser | Apr. 13, 1954 |
| 2,703,013 | Wildhack | Mar. 1, 1955 |